United States Patent
Lee et al.

(10) Patent No.: US 8,660,066 B2
(45) Date of Patent: *Feb. 25, 2014

(54) METHOD FOR CONSTRUCTING RACH PREAMBLE AND METHOD FOR TRANSMITTING RACH SIGNAL

(75) Inventors: Hyun Woo Lee, Anyang-si (KR); Seung Hee Han, Anyang-si (KR); Min Seok Noh, Seoul (KR); Jin Sam Kwak, Gunpo-si (KR); Dragan Vujcic, Orsay (FR); Dong Cheol Kim, Suwon-si (KR); Yeong Hyeon Kwon, Suwon-si (KR)

(73) Assignee: LG Electronics Inc., Seoul (KR)

( * ) Notice: Subject to any disclaimer, the term of this patent is extended or adjusted under 35 U.S.C. 154(b) by 149 days.

This patent is subject to a terminal disclaimer.

(21) Appl. No.: 13/332,298

(22) Filed: Dec. 20, 2011

(65) Prior Publication Data

US 2012/0099532 A1 Apr. 26, 2012

Related U.S. Application Data

(63) Continuation of application No. 12/188,116, filed on Aug. 7, 2008, now Pat. No. 8,107,445.

(60) Provisional application No. 60/955,030, filed on Aug. 9, 2007.

(30) Foreign Application Priority Data

Nov. 27, 2007 (KR) .................. 10-2007-0121465

(51) Int. Cl.
    *H04W 4/00* (2009.01)
(52) U.S. Cl.
    USPC ........... 370/328; 370/336; 370/252; 370/329; 375/296; 375/299; 375/267; 375/344

(58) Field of Classification Search
    USPC .......... 370/336, 329, 328, 335; 375/260, 296, 375/267, 344, 342
    See application file for complete search history.

(56) References Cited

U.S. PATENT DOCUMENTS

2007/0165567 A1* 7/2007 Tan et al. ..................... 370/329
2007/0230600 A1* 10/2007 Bertrand et al. .............. 375/260

(Continued)

FOREIGN PATENT DOCUMENTS

| JP | 2000228787 | 8/2000 |
| JP | 2005020772 | 1/2005 |

(Continued)

OTHER PUBLICATIONS

LG Electronics, "Additional Burst Types for Non-Synchronized RACH", 3GPP TSG RAN WG1 Meeting #49bis, R1-072862, Jun. 2007.

(Continued)

*Primary Examiner* — Rasheed Gidado
(74) *Attorney, Agent, or Firm* — Lee, Hong, Degerman, Kang & Waimey

(57) ABSTRACT

A wireless communication system is disclosed. A method for constructing a RACH preamble according to a cell radius of a base station (BS) irrespective of a guard time (GT) and a method for allocating the RACH preamble are disclosed. A method for constructing a preamble of a random access channel (RACH) includes acquiring time-length information of a predetermined cyclic prefix (CP) for each cell radius of a base station (BS), acquiring sequence time-length information of a single sequence or a repeated sequence, and constructing the preamble using the predetermined CP time-length information and the sequence time-length information, irrespective of a time length of a guard time (GT).

16 Claims, 9 Drawing Sheets

(56) References Cited

U.S. PATENT DOCUMENTS

| | | | |
|---|---|---|---|
| 2007/0291696 A1* | 12/2007 | Zhang et al. | 370/331 |
| 2008/0043613 A1* | 2/2008 | Yang et al. | 370/208 |
| 2008/0267134 A1* | 10/2008 | Cheng et al. | 370/335 |
| 2010/0220666 A1 | 9/2010 | Imamura et al. | |

FOREIGN PATENT DOCUMENTS

| | | |
|---|---|---|
| JP | 2006157928 | 6/2006 |
| RU | 2232469 | 7/2004 |
| WO | 99/23844 | 5/1999 |
| WO | 2007037414 | 4/2004 |
| WO | 2005/004500 | 1/2005 |
| WO | 2007/001222 | 1/2007 |
| WO | 2007/074841 | 7/2007 |
| WO | 2007074841 | 7/2007 |

OTHER PUBLICATIONS

LG Electronics, "Additional Burst Types for Non-Synchronized RACH", 3GPP TSG RAN WG1 Meeting #50, R1-073499, Aug. 2007.

Russian Federation Federal Service for Intellectual Property, Patents and Trademarks Application Serial No. 2010105701/07, Notice of Allowance dated Oct. 30, 2012, 10 pages.

LGE, "RACH Sequence Design Based on Repetition Method," R1-062556, 3GPP TSG RAN1 LTE WG1 Meeting #46bis, Oct. 2006, XP-050103073.

IPWireless, "Required RACH Preamble Length," R1-062914, 3GPP TSG RAN WG1 #46bis, Oct. 2006, XP-050103396.

Alcatel-Lucent, "Non-synchronized RACH Range Extension," R1-072361, 3GPP TSG-RAN WG1 #49, May 2007, XP-050106089.

Liu et al., "Preamble Design Based on Complete Complementary Sets for Random Access in MIMO-OFDM Systems", Wireless Communications and Networking Conference, 2007.WCNC 2007. IEEE, Mar. 2007.

Popovic et al., "Random Access Preambles for Evolved UTRA Cellular System", 2006 IEEE Ninth International Symposium on Spread Spectrum Techniques and Applications, Aug. 2006.

Alcatel-Lucent, "Non-synchronized Rach Range Extension", 3GPP TSG-RAN WG1 #49, R1-072361, May 2007.

LG Electronics, "Multi-TTI RACH Preamble Design," 3GPP TSG RAN WG1 Meeting #48, R1-070905, Feb. 2007, 4 pages.

LG Electronics, "RACH Design Issues of Large Cell Deployment," 3GPP TSG RAN WG1 Meeting #46bis, R1-062557, Oct. 2006, 6 pages.

\* cited by examiner

METHOD FOR CONSTRUCTING RACH PREAMBLE AND METHOD FOR TRANSMITTING RACH SIGNAL

CROSS-REFERENCE TO RELATED APPLICATIONS

This application is a continuation of U.S. application Ser. No. 12/188,116, filed on Aug. 7, 2008, now U.S. Pat. No. 8,107,445, which claims the benefit of earlier filing date and right of priority to the Korean Patent Application No. 10-2007-0121465, filed on Nov. 27, 2007, and also claims the benefit of U.S. Provisional Application Ser. No. 60/955,030, filed on Aug. 9, 2007, the contents of all of which are hereby incorporated by reference herein in their entireties.

BACKGROUND OF THE INVENTION

1. Field of the Invention

The present invention relates to a wireless communication system, and to a method for constructing a random access channel (RACH) and a method for transmitting a RACH signal.

2. Discussion of the Related Art

A method for constructing a random access channel (RACH) and a method for transmitting a RACH signal will hereinafter be described in detail.

There is proposed a method for preventing the occurrence of an inter-symbol interference (ISI) while each symbol of the sub-carrier is transmitted over a multi-path channel in either an Orthogonal Frequency Division Multiplexing (OFDM) or a Discrete Multi-Tone (DMT), and a detailed description of the above method will hereinafter be described.

For example, a guard time (GT) longer than a maximum delay spread of a channel is inserted between successive symbols. In brief, this guard time (GT) is called a cyclic extension. The cyclic extension (CE) is classified into a cyclic prefix (CP) and a cyclic suffix (CS). The cyclic prefix (CP) copies the signal of the last time of an effective symbol time, and inserts the copied signal to the front part, such that it prevents orthogonality between sub-carriers from being broken or damaged. The cyclic suffix (CS) copies the signal of a first time of an effective symbol, and attaches the copied signal to the end part.

A single RACH signal may include a CP time, a sequence time, and a guard time. The CP time copies a signal of the last time of the effective symbol time, and inserts the copied signal to the front part, such that it prevents orthogonality between sub-carriers caused by the signals received with different time delays.

The sequence time corresponds to the effective symbol time of the RACH signal. In fact, the sequence time indicates a time interval in which the sequence defined by the RACH signal is actually transmitted. In more detail, the sequence time is a time occupied by an actual transmission end after the defined sequence has executed necessary steps (e.g., over-sampling). The guard time (GT) of the RACH signal is indicative of an empty space having no transmission (Tx) signal, such that it prevents the next-symbol orthogonality from being broken or interfered by the signals received with relatively-high time delays.

A general RACH transmission structure and the influence of a frequency offset will hereinafter be described in detail.

A random access channel (RACH) is a channel used when a user equipment (UE) acquires initial uplink synchronization. If the user equipment (UE) is firstly powered on, or the terminal (UE) is switched to an active status after it has been in an idle mode for a long period of time, uplink synchronization should be re-established. The RACH is generally adapted to re-establish the uplink synchronization, and need not establish time synchronization or frequency synchronization.

The RACH basically supports a multi-user mode. Each user equipment (UE) transmits a specific preamble sequence when accessing the RACH. If a base station (BS) recognizes the preamble sequence received from the user equipment (UE), it transmits the recognized preamble sequence to a downlink. The user equipment (UE) updates its own time synchronization information using specific information contained in a downlink signal received from the base station (BS). In this case, if the base station (BS) transmits frequency synchronization information along with the time synchronization information, this frequency synchronization information can also be used to correct the user equipment (UE).

The basic requirements for RACH are used to satisfy a round trip delay (RTD) and the condition of a path loss, irrespective of a UE speed, a frequency offset, a cell radius, etc.

For example, the 3GPP LTE communication standard serving as one of current communication system-associated standards has been intensively discussed about the RACH structure which has the length of a 1 ms TTI (transmission Timing Interval), a cyclic prefix (CP) of 102.6 μs, a sequence length of 0.8 ms, a guard time (GT) of 97.5 μs. In this case, the time length other than the channel delay spread in the cyclic prefix (CP) has been intensively discussed as the length of the guard time (GT).

The cell radius of about 15 km can be used as the above-mentioned CP or GT.

In this case, the CP and GT may have different lengths requisite for individual cell radiuses. However, the cell size may be larger than 15 km as necessary. Presently, many developers are conducting an intensive research into a method for covering the length of more than 100 km, such that an additional RACH structure is needed.

SUMMARY OF THE INVENTION

Accordingly, the present invention is directed to a method for constructing a RACH preamble and a method for transmitting a RACH signal that substantially obviate one or more problems due to limitations and disadvantages of the related art.

An object of the present invention is to provide a method for generating a fixed CP contained in a RACH signal capable of covering a cell radius required by a base station (BS).

Another object of the present invention is to provide a method for generating a RACH preamble using a predetermined CP and a predetermined sequence.

Another object of the present invention is to provide a method for assigning the RACH preamble sequence to each UE.

Another object of the present invention is to provide a method for constructing a RACH preamble according to a cell radius of a base station (BS) irrespective of a guard time (GT) and a method for allocating the RACH preamble.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these objects and other advantages and in accordance with the purpose of the invention, as embodied and broadly described herein, a method for constructing a preamble of a random access channel (RACH) comprising: acquiring time-length information of a predetermined cyclic prefix (CP) for each cell radius of a base station (BS); acquiring sequence time-length information of a single sequence or a repeated sequence; and constructing the preamble using the predetermined CP time-length information and the sequence time-length information, irrespective of a time length of a guard time (GT).

Preferably, the predetermined CP time-length information is generated by a cell radius supportable by a system, a maximum delay spread, and a maximum round trip delay (RTD).

Preferably, the predetermined CP time-length information has any one of time-length values $3152 \times T_S$, $6224 \times T_S$, and $21012 \times T_S$ according to the cell radius, where "$T_S$" is a sampling interval denoted by $$\frac{1}{30.72 \text{ MHz}}.$$

Preferably, the predetermined CP time-length information satisfies a maximum cell radius request supportable by a system, irrespective of the sequence time-length information.

Preferably, the single sequence has a time-length value denoted by $24576 \times T_S$, and the repeated sequence has a time-length value denoted by $2 \times 24576 \times T_S$, where "$T_S$" is a sampling interval denoted by $$\frac{1}{30.72 \text{ MHz}}.$$

Preferably, the preamble includes a first preamble, a second preamble, a third preamble, and a fourth preamble, in which the first preamble includes a cyclic prefix (CP) having a time length of $3152 \times T_S$ and a sequence having a time length of $24576 \times T_S$; the second preamble includes a cyclic prefix (CP) having a time length of $21012 \times T_S$ and a sequence having a time length of $24576 \times T_S$; the third preamble includes a cyclic prefix (CP) having a time length of $6224 \times T_S$ and a sequence having a time length of $2 \times 24576 \times T_S$; and the fourth preamble includes a cyclic prefix (CP) having a time length of $21012 \times T_s$ and a sequence having a time length of $2 \times 24576 \times T_S$, where "$T_S$" is a sampling interval denoted by $$\frac{1}{30.72 \text{ MHz}}.$$

In another aspect of the present invention, there is provided a method for transmitting a random access channel (RACH) signal comprising: receiving information of a predetermined preamble format from a base station (BS); and transmitting a random access channel (RACH) signal to the base station (BS) using a preamble contained in the predetermined preamble format, in which the predetermined preamble format is constructed by a predetermined cyclic prefix (CP), a single sequence, or a repeated sequence according to a cell radius of the base station (BS), irrespective of a time length of a guard time (GT).

Preferably, the predetermined preamble format includes time-length information of the predetermined cyclic prefix (CP) and sequence time-length information.

Preferably, if the sequence time-length information indicates that the sequence contained in the preamble is the single sequence, the predetermined CP time-length information indicates whether the predetermined cyclic prefix (CP) is an extended cyclic prefix (CP).

Preferably, the single sequence has a time-length value denoted by $24576 \times T_S$, and if the predetermined cyclic prefix is not the extended cyclic prefix, the predetermined cyclic prefix (CP) has a time-length value denoted by $3152 \times T_S$, and if the extended cyclic prefix (CP) is the extended cyclic prefix, the predetermined cyclic prefix has a time-length value denoted by $21012 \times T_S$, where the "$T_S$" is a sampling interval denoted by $$\frac{1}{30.72 \text{ MHz}}.$$

Preferably, if the sequence time-length information indicates that the sequence contained in the preamble is the repeated sequence, the predetermined CP time-length information indicates whether the predetermined cyclic prefix (CP) is an extended cyclic prefix (CP) or a middle cyclic prefix (CP).

Preferably, the repeated sequence has a time-length value denoted by $2 \times 24576 \times T_S$, and if the predetermined cyclic prefix (CP) is the extended cyclic prefix, the predetermined cyclic prefix has a time-length value denoted by $21012 \times T_S$, and if the predetermined cyclic prefix is the middle cyclic prefix, the predetermined cyclic prefix has a time-length value denoted by $6224 \times T_S$, where the "$T_S$" is a sampling interval denoted by $$\frac{1}{30.72 \text{ MHz}}.$$

Preferably, the time length of the guard time (GT) is adjusted by the base station (BS) according to the cell radius.

In another aspect of the present invention, there is provided a method for receiving a random access channel (RACH) signal comprising: receiving information of a predetermined preamble format to each user equipment (UE); and receiving the RACH signal from each user equipment (UE), wherein the predetermined preamble format is constructed by a predetermined cyclic prefix (CP), a single sequence, or a repeated sequence according to a cell radius, irrespective of a time length of a guard time (GT).

Preferably, the time length of the guard time (GT) is adjusted according to the cell radius.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
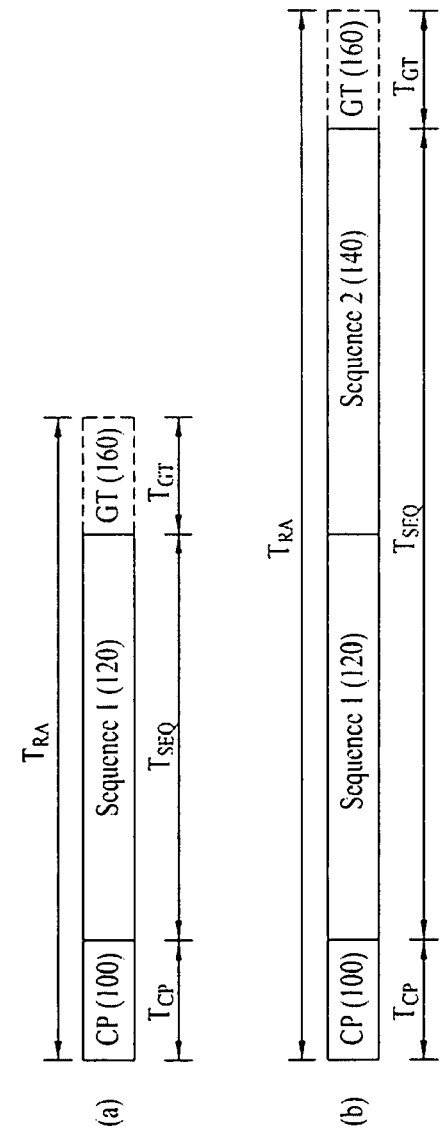
FIG. 1 is a conceptual diagram illustrating a RACH structure according to the present invention.

Reference will now be made in detail to the preferred embodiments of the present invention, examples of which are illustrated in the accompanying drawings. Wherever possible, the same reference numbers will be used throughout the drawings to refer to the same or like parts.

The present invention relates to a wireless communication system. Specifically, the present invention relates to a method for constructing a RACH preamble according to a cell radius of a base station (BS) irrespective of a guard time (GT) length and a method for transmitting a RACH signal.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The following embodiments of the present invention will be disclosed on the basis of a data communication relationship between the base station (BS) and the user equipment (UE). In this case, the base station (BS) is used as a terminal node of a network via which the base station (BS) can directly communicate with the user equipment (UE). Specific operations to be conducted by the user equipment (US) in the present invention may also be conducted by an upper node of the base station (BS) as necessary.

In other words, it will be obvious to those skilled in the art that various operations for enabling the base station (BS) to communicate with the user equipment (US) in a network composed of several network nodes including the base station (BS) will be conducted by the base station (BS) or other network nodes other than the base station (BS).

The term "Base Station" may be replaced with a fixed station, Node-B, eNode-B (eNB), or an access point as necessary. The user equipment (UE) may be replaced with a mobile station (MS) or a mobile subscriber station (MSS) as necessary.

The following embodiments of the present invention can be implemented by hardware, firmware, software, or a combination of them.

In the case of implementing the present invention by hardware, the present invention can be implemented with ASICs (application specific integrated circuits), DSPs (Digital signal processors), DSPDs (digital signal processing devices), PLDs (programmable logic devices), FPGAs (field programmable gate arrays), a processor, a controller, a microcontroller, or a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

Constructions, operations, and other characteristics of the present invention will be easily understood by the following embodiments shown in the annexed drawings.

FIG. 1 is a conceptual diagram illustrating a RACH structure according to the present invention.

Referring to FIG. 1, a normal RACH preamble includes a CP 100, a sequence 120, and a guard time (GT) 160. The CP 100's length can be represented by TCP. The sequence 120's length can be represented by TSEQ. The GT 160's length can be represented by TGT. A total length of the RACH burst can be represented by TRA equal to the sum of TCP, TSEQ and TGT. An extended RACH preamble indicates that the CP 100's length is extended.

Referring to FIG. 1B, the RACH preamble may include a CP 100, a first sequence 120, a second sequence 140, and a guard time (GT) 160. If a cell radius which must be managed by a base station (BS) is wide, a repeated sequence for reliable data transmission can be used.

The RACH preamble may have a variety of formats. Specifically, the sequence can be repeatedly configured. The following embodiment of the present invention describes that the sequence is repeated just once. Needless to say, the sequence may also be repeated one or more times. The RACH preamble may be decided by the CP- or GT-length. However, the GT has no actual information, such that the RACH preamble is decided by the CP.

A variety of methods for calculating a fixed cyclic prefix (CP) length will hereinafter be described in detail.

Figure 2A:
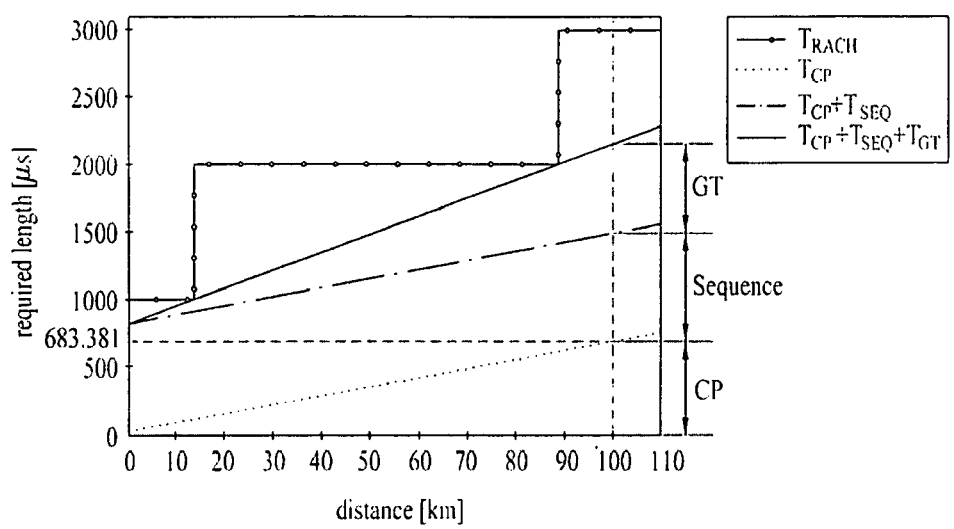
FIGS. 2a~2b are graphs illustrating a variance in CP, GT, or RACH length required for a cell radius of the base station (BS) according to the present invention.
Figure 2B:
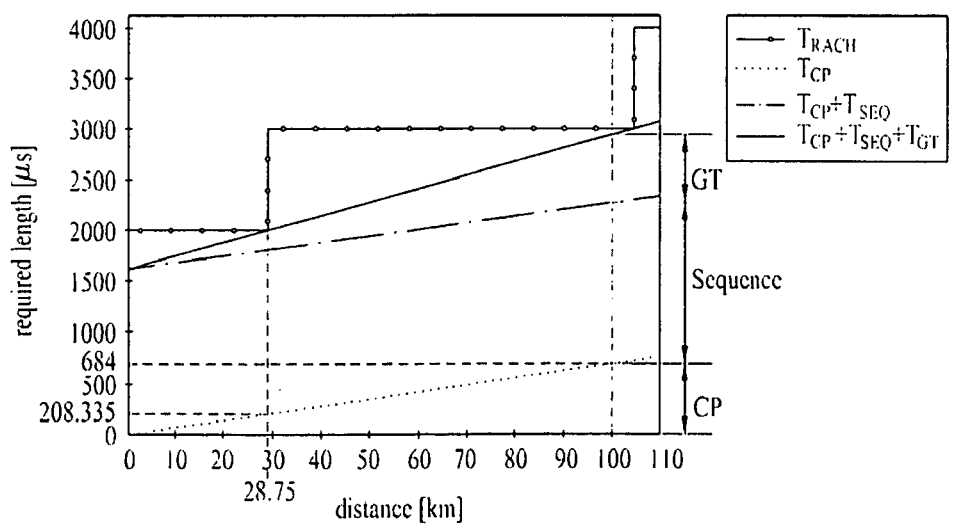

FIGS. 2a~2b are graphs illustrating a variance in CP, GT, or RACH length required for a cell radius of the base station (BS) according to the present invention.

Numerical values for use in the embodiments of the present invention are disclosed for only illustrative purposes, and it is obvious to those skilled in the art that the numerical values can be changed to others according to user requirements or communication environments.

Referring to FIGS. 2a~2b, TRACH is a TTI allocated to the RACH according to the cell radius. In this case, "1 TTI" has the length of 1000 (1 ms), "TCP" is a CP variance based on the cell radius, "TCP+TSEQ" is a variance of the sum of TCP and TSEQ lengths, and "TCP+TSEQ+TGT" is a variance of an actual RACH length based on the cell radius.

Generally, the CP can be decided by a maximum round trip delay (RTD) length and the length of a maximum delay spread. In this case, a normal CP and an extended CP can be considered for an uplink data preamble. However, in order to allow the CP used for any uplink data preambles to stably use the RACH, it is assumed that the present invention uses the extended CP irrespective of the CP length of an uplink data preamble. For the convenience of description and better understanding of the present invention, in order to calculate the RACH's CP length, it is assumed that a maximum delay spread time is 16.67, FIG. 2a shows the length of a CP required by the cell radius when the sequence length is 0.8 ms. If the cell radius capable of being covered by the base station (BS) is 100 km, it can be recognized that the CP length is 683.381. In this case, for the RACH signal, 3 TTIs are allocated. However, the interval occupied by an actual RACH is not equal to the 3 TTIs, such that the radio resources corresponding to a difference between the 3 TTIs and the actually-occupied part may be wasted.

FIG. 2b shows the length of a CP required for the cell radius when the length of a total sequence is 1.6 ms according to a repeated sequence. If the cell radius capable of being covered by the base station (BS) is 100 km, the CP length is 648, In this case, 3 TTIs may be assigned for the RACH signal.

Referring to FIGS. 2a and 2b, if a single sequence is used, the cell radius capable of being managed by 2 TTIs is about 87 km. If the repeated sequence is used, the cell radius capable of being covered by 2 TTIs is about 28.75 km. If 3 TTIs are allocated to cover the cell radius of 100 km and a single sequence is used, all of the 3 TTIs assigned for the RACH are not used, such that radio resources may be unnecessarily wasted. In this case, if the repeated sequence is used, it can be recognized that the amount of wasted radio resources of FIG. 2b is less than that of FIG. 2a.

FIGS. 3a~3D are graphs illustrating RACH structures configured when a predetermined CP and a predetermined sequence are used according to the cell radius which should be managed by the base station (BS) according to the present invention.

Referring to FIGS. 3a~3D, TRACH is a TTI allocated to the RACH according to the cell radius. In this case, "TCP" is a CP variance based on the cell radius, "TCP+TSEQ" is a variance of the sum of TCP and TSEQ lengths, and "TCP+TSEQ+TGT" is a variance of an actual RACH length based on the cell radius.

Figure 3A:
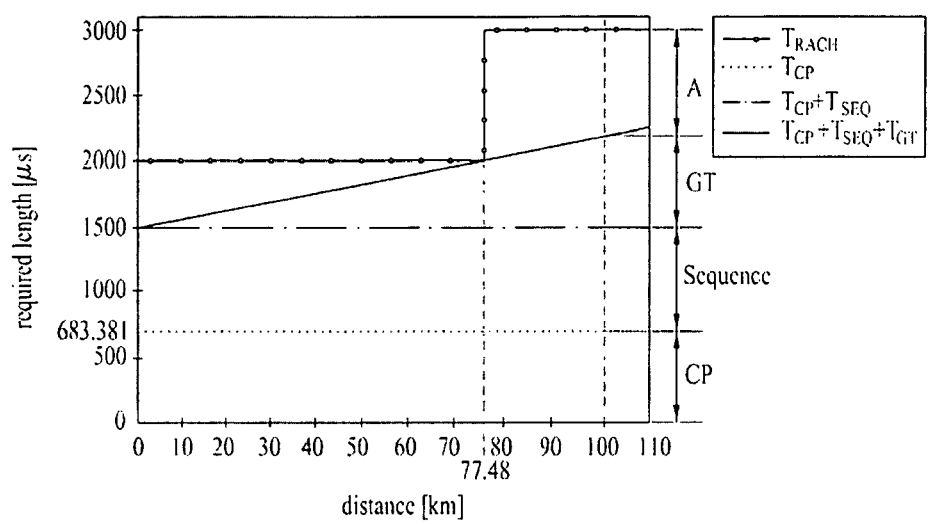
FIGS. 3a~3d are graphs illustrating RACH structures configured when a predetermined CP and a predetermined sequence are used according to the cell radius which should be managed by the base station (BS) according to the present invention.

In FIG. 3a, a fixed CP is 683.381, and a sequence length is 0.8 ms. In this case, the base station (BS) can manage or cover the cell radius of 77.48 km using 2 TTIs. Also, the base station (BS) can cover the cell radius of 100 km or more using the 3 TTIs. If the 3 TTIs are allocated to cover the cell radius of 100 km, radio resources corresponding to "A" may be wasted.

Figure 3B:
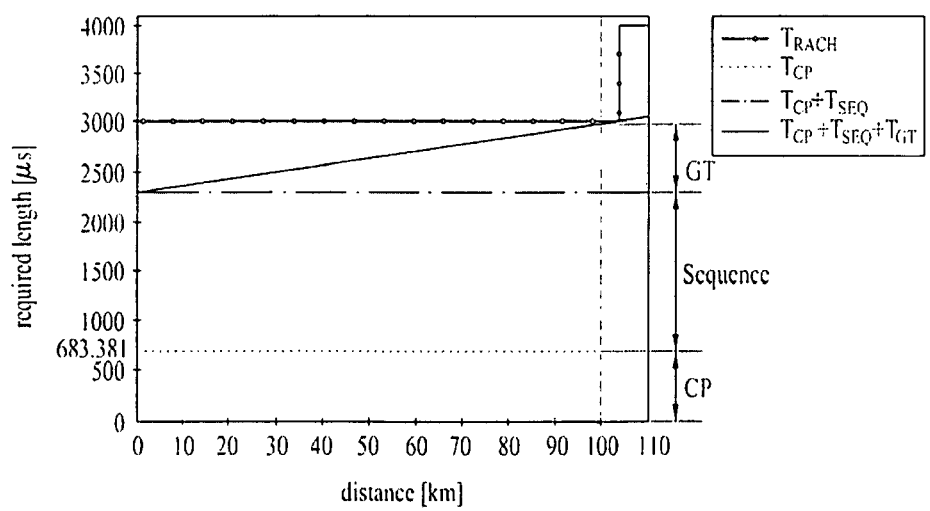

In FIG. 3B, a fixed CP is 683.381, and a total length of the repeated sequence is 1.6 ms. In this case, the base station (BS) is unable to manage or cover a desired cell radius of 77.48 km using 2 TTIs. However, the base station (BS) is able to manage or cover the cell radius of 100 km using 3 TTIs. In this case, the cell radius capable of being covered by the base station (BS) is almost equal to a used TTI size, such that the amount of wasted radio resources of FIG. 3a can be reduced.

Figure 3C:
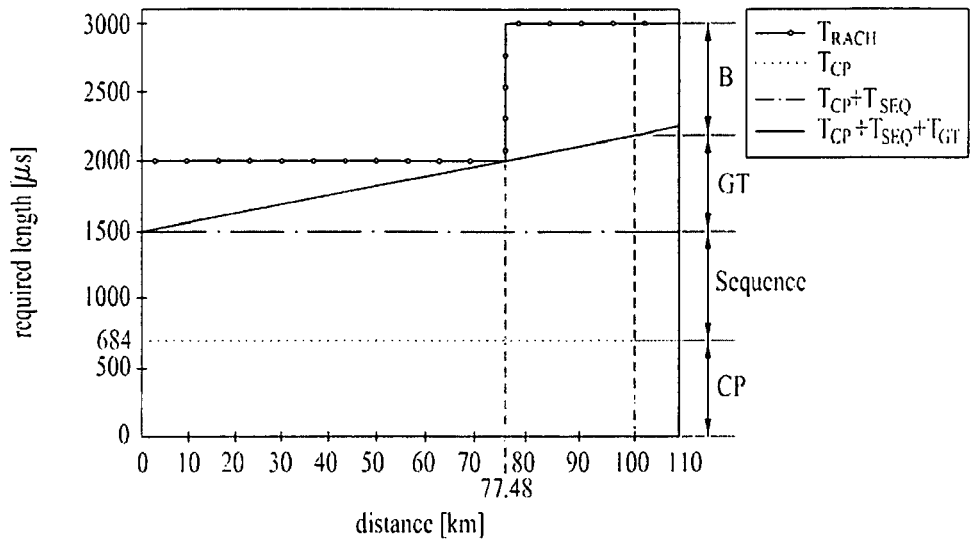

In FIG. 3C, a fixed CP is 684, and a sequence length is 0.8 ms. In this case, the base station (BS) is unable to manage or cover a desired cell radius of 77.48 km using 2 TTIs allocated to the RACH. Also, it can be recognized that the cell radius of 100 km can be managed or covered by the 3 TTIs. However, if the base station (BS) allocates the 3 TTIs to cover the cell radius of 100 km, radio resources corresponding to "B" can be wasted.

Figure 3D:
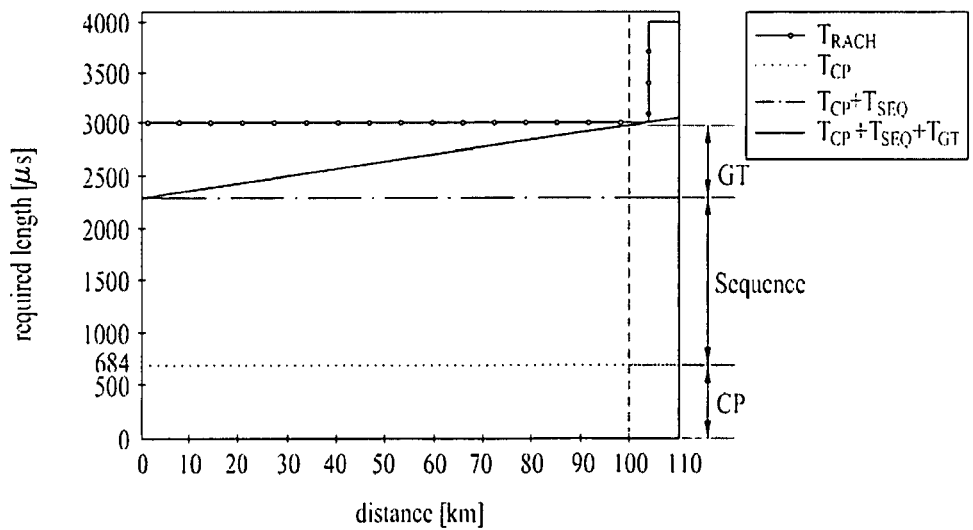

In FIG. 3D, a fixed CP is 684, and a total length of the repeated sequence is 1.6 ms. In this case, the base station (BS) is unable to manage or cover a desired cell radius using 2 TTIs. However, the base station (BS) is able to manage or cover the cell radius of 100 km or more using 3 TTIs. In this case, the cell radius capable of being covered by the base station (BS) is almost equal to a used TTI size, such that the amount of wasted radio resources of FIG. 3C can be reduced.

FIGS. 2 and 3 show a method for calculating a fixed CP length of a specific cell radius so as to use a simple RACH structure. In other words, it is preferable that the length of all RACH CPs is set to a specific length supporting the cell radius capable of being covered by the base station (BS). For example, the cell radius may be 100 km or higher, and the RACH CP may be able to cover this cell radius of at least 100 km.

If the base station (BS) uses a predetermined number of CP lengths within the coverable cell radius, there is no need to consider the CP length for each cell radius, resulting in reduction of the complexity of a hardware design. Although the cell radius is changed to another, the present invention can use only a less number of RACH structures. According to the embodiments of the present invention, it is assumed that the cell radius supportable by the base station (BS) is set to about 100 km and the CP length is set to about 30 km.

In fact, the guard time (GT) of the RACH has no data therein. Therefore, the user equipment (UE) need not always recognize GT information, whereas it must recognize the CP- or sequence-length. The GT length is adjusted by the base station (BS) according to the cell radius.

The base station (BS) may allocate 2 TTIs or 3 TTIs to the RACH according to the cell radius. However, in fact, the GT has no transmission signal, such that the user equipment (UE) need not recognize GT information whereas it must decide whether the CP length or the sequence is repeated and must recognize only the repeated length of the CP or sequence.

Figure 4A:
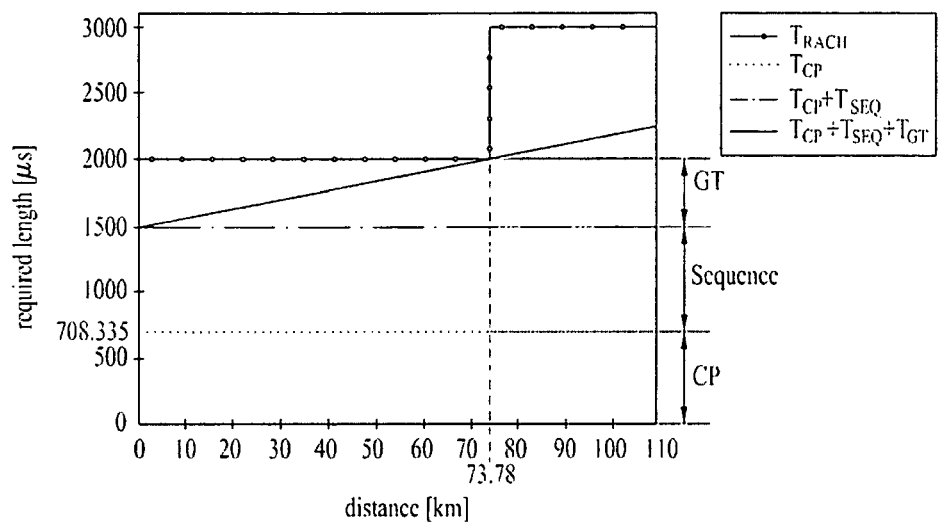
FIGS. 4a~4b shows GT and RACH lengths required for the cell radius when the CP length is 708.335 according to the present invention.
Figure 4B:
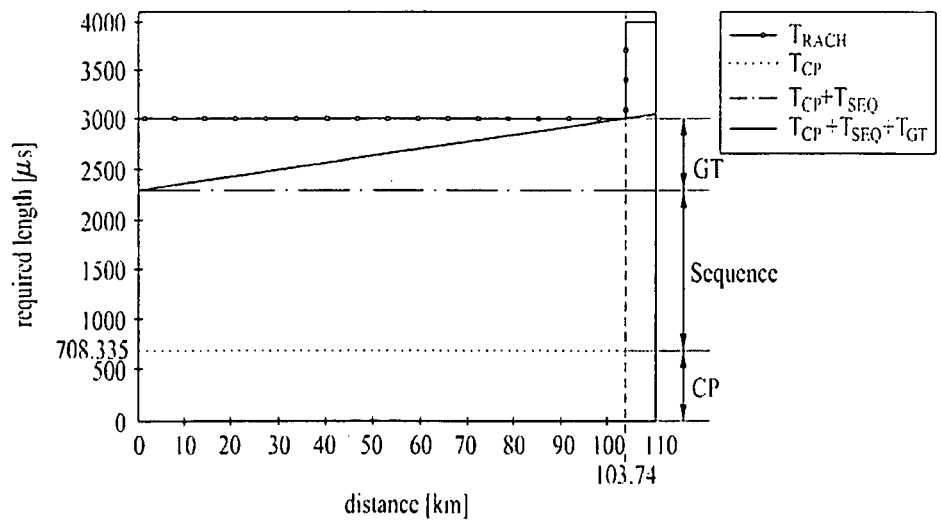

FIGS. 4a~4b shows GT and RACH lengths required for the cell radius when the CP length is 708.335 according to the present invention.

Referring to FIGS. 4a~4b, TRACH is a TTI allocated to the RACH according to the cell radius. In this case, "TCP" is a CP variance based on the cell radius, "TCP+TSEQ" is a variance of the sum of TCP and TSEQ lengths, and "TCP+TSEQ+TGT" is a variance of an actual RACH length based on the cell radius.

The cell radius capable of being covered by the base station (BS) can be decided by the RACH CP length and the GT value. If 3 TTIs are allocated to the RACH, the CP length must be adjusted to use all radio resources actually allocated to the RACH.

Therefore, according to this embodiment of the present invention, it is assumed that the RACE CP length is set to the sum of a round trip delay (RTD) 691.665 and a maximum delay spread time 16.67 in association with the distance of 103.74283 km. In more detail, the CP length is set to 708.335.

If a CP length is 708.335 and a sequence length is 0.8 ms, FIG. 4a shows the cell radius capable of being covered by the base station (BS). The base station (BS) can cover the distance of 73.78 km by allocating 2 TTIs to the RACE. If the base station (BS) allocates 3 TTIs to the user equipment (UP), it can cover the length of at least 100 km. However, in this case, the RACH does not occupy all parts of the 3 TTIs, such that wasted radio resources may occur.

If a CP length is 708.335 and a sequence length is 1.6 ms, FIG. 4b shows the cell radius capable of being covered by the base station (BS). If 2 TTIs are allocated to the user equipment (UP), the base station (BS) is unable to cover the cell radius. However, if the base station (BS) allocates 3 TTIs to the user equipment (UP), it can extend the range of the cell coverage to 103.74 km. In this case, it is assumed that the cell radius required by the base station (BS) is 100 km, such that the present invention can prevent wasted radio resources from being generated.

Referring to FIGS. 2 to 1, the present invention can fixedly select a predetermined CP according to the cell radius which must be covered by the base station (BS). In more detail, if a CP corresponding to a maximum cell coverage of a base station (BS) is decided and a RACH preamble is constructed by the decided CP, the present invention need not continuously calculate the CP length according to the cell radius, and at the same time need not construct the RACH preamble according to the calculated CP length, resulting in reduction of a hardware complexity. Namely, the present invention can guarantee a cell coverage required for the base station (BS) using a single RACH structure or a small number of RACH structures.

A method for constructing an additional RACH preamble using a predetermined CP will hereinafter be described with reference to FIGS. 2 to 4.

Figure 5:
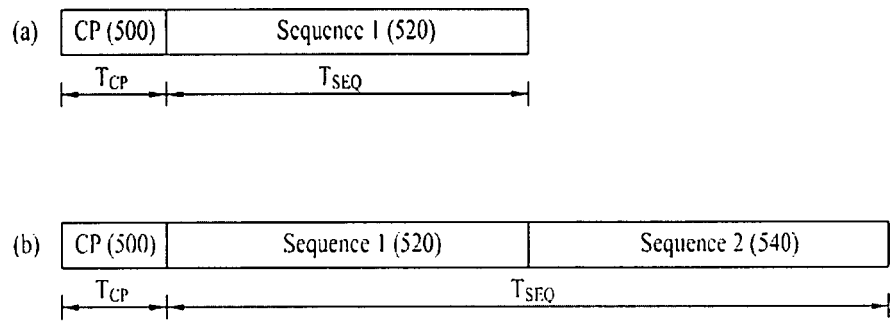
FIG. 5 is a conceptual diagram illustrating a method for constructing a RACH preamble using the CO and the sequence without considering the guard time (GT) length according to the present invention.

FIG. 5 is a conceptual diagram illustrating a method for constructing a RACH preamble using the CP and the sequence without considering the guard time (GT) length according to the present invention.

Referring to FIG. 5, the GT time value is not contained in the RACH preamble. In fact, the GT has no data, such that the base station (BS) is able to adjust the GT length according to the cell radius. Therefore, the user equipment (UE) needs to the time length value of either the CP part or the sequence part, such that the UE can access the RACH. The RACH preamble structure can also be composed of the CP and sequence parts.

Referring to FIG. 5a, a normal RACH preamble includes a CP 500 and a sequence 520. The CP 500's length can be represented by TCP. The sequence 520's length can be represented by TSEQ. A total length of the RACH preamble can be represented by the sum of TCP and TSEQ. An extended RACH preamble is basically equal to a normal RACH preamble, however, the CP 500's length of the extended RACH preamble is extended.

Referring to FIG. 5b, the repeated RACH preamble may include a CP 500, a first sequence 520, and a second sequence 540. The repeated preamble can be repeatedly used. In other words, if the cell radius which must be managed by the base station (BS) is wide, the repeated RACH preamble can be used to implement reliable communication. Otherwise, although the base station (BS) has a poor channel environment, the repeated RACH preamble can also be used to the implement reliable communication.

In FIG. 5, the CP of a normal RACH preamble has the length of 102.6, It is assumed that the CP of an extended RACH preamble is set to any one of 683.381, 684, or 708.335, Therefore, the RACH preamble format having the CP- or sequence-value will hereinafter be described. For the convenience of description and better understanding of the present invention, a system bandwidth is 20 MHz and a sampling frequency is 30.72 MHz. In this case, a sampling interval of Ts is calculated as $$\frac{1}{30.72 \text{ MHz}},$$

such that it may be 32.55208333 ns.

In this case, if the maximum delay spread (16.67) is subtracted from the CP length of 683.381, and the subtracted result is divided by "S" km, the supportable cell radius is about 100 km (i.e., a round-up value of 99.93746473 km). In this case, "S" km is a round trip delay (RTD) item, and indicates a predetermined time during which the light beam is reciprocated per kilometer.

In this way, the CP length can be calculated in different ways according to the rounding-off delay and the rounding error of the speed of light used by the CP-length calculation.

Ts is very low, such that it can be understood that there is a large difference between the different CP lengths. If the CP length is incorrectly represented by a multiple of the Ts value, it may be correctly represented by a rounding function, a rounding-up function, and a rounding-down function.

The following table 1 shows RACH parameters acquired when the extended RACH preamble and the sequence-repeated RACH preamble structure use the same CP (e.g., CP=683.381).

TABLE 1

| Frame Structure | Preamble Type | $T_{RA}$ | $T_{CP}$ | $T_{SEQ}$ |
|---|---|---|---|---|
| Type 1 | Normal | $30720 \times T_S$ | $3152 \times T_S$ | $24576 \times T_S$ |
|  | Extended | $61440 \times T_S$ $92160 \times T_S$ | $20993 \times T_S$ | $24576 \times T_S$ |
|  | Repeated | $61440 \times T_S$ $92160 \times T_S$ | $3152 \times T_S$ $20993 \times T_S$ | $2 \times 24576 \times T_S$ |

Table 1 shows parameters of a RACH structure when the cell radius managed by the base station (BS) is 100 km.

In Table 1, if the preamble type is indicative of "Normal", "Normal" indicates a normal RACH. In this case, the CP length of the RACH is represented by 3152×TS, and the sequence length is set to 24576×TS. If the preamble type is indicative of "Normal", the cell radius is shorter than about 15 km.

If the preamble type is "Extended", a RACH duration of the base station (BS) is set to 2 TTIs (e.g., TRA 61440×TS) or 3 TTIs (e.g., TRA=92160×TS), such that the selected RACH duration is allocated the user equipment (UE). In this case, the base station (BS) may use an extended CP. In this case, the CP length of the RACH is represented by 20993×TS, and the sequence length is represented by 24576×TS.

If the preamble type is "Repeated" and the base station (BS) uses the CP having the length 20993×TS, the base station (BS) allocates the 3 TTIs to the RACH. However, if the cell radius is very small, the base station (BS) may use a short CP (e.g., CP=3152×TS) within the repeated RACH. In this case, the base station (BS) can optionally determine the RACH duration to be 2 TTIs (e.g., TRA=61440×TS) or 3 TTIs (e.g., TRA=92160×TS) in the same manner as in the extended RACH. In this case, the CP time length of the RACH may be set to 3152×TS or 20993×TS, and the time length of the sequence may be set to 2×24576×TS.

The following table 2 shows RACH parameters acquired when the extended RACH preamble and the sequence-repeated RACH preamble structure use the same CP (e.g., CP=684).

TABLE 2

| Frame structure | Preamble Type | $T_{RA}$ | $T_{CP}$ | $T_{SEQ}$ |
|---|---|---|---|---|
| Type 1 | Normal | 30720 × $T_S$ | 3152 × $T_S$ | 24576 × $T_S$ |
|  | Extended | 61440 × $T_S$<br>92160 × $T_S$ | 21012 × $T_S$ | 24576 × $T_S$ |
|  | Repeated | 61440 × $T_S$<br>92160 × $T_S$ | 3152 × $T_S$<br>21012 × $T_S$ | 2 × 24576 × $T_S$ |

Table 2 is basically similar to Table 1. In more detail, Table 2 shows a RACH structure acquired when the length of a fixed CP used by either the extended RACH or the repeated RACH is 684, The following table 3 shows RACH parameters acquired when the extended RACH preamble and the sequence-repeated RACH preamble structure use the same CP (e.g., CP=708.335).

TABLE 3

| Frame structure | Preamble Type | $T_{RA}$ | $T_{CP}$ | $T_{SEQ}$ |
|---|---|---|---|---|
| Type 1 | Normal | 30720 × $T_S$ | 3152 × $T_S$ | 24576 × $T_S$ |
|  | Extended | 61440 × $T_S$<br>92160 × $T_S$ | 21760 × $T_S$ | 24576 × $T_S$ |
|  | Repeated | 61440 × $T_S$<br>92160 × $T_S$ | 3152 × $T_S$<br>21760 × $T_S$ | 2 × 24576 × $T_S$ |

The RACH structure shown in Table 3 is basically similar to that of Table 1. In more detail, Table 3 shows a RACH structure acquired when the cell radius managed by the base station (BS) is 103.74 km and the RACH CP is 708.335, Referring to Tables 1~3, the present invention can cover all the RACH preamble structures using two CP lengths (i.e., 3152×TS and 20993×TS, 3152×TS and 21012×TS, or 3152×TS and 21760×TS) according to individual requirements.

A method for allowing the base station (BS) to inform the UE of RACH structure information shown in Tables 1~3 according to the present invention will hereinafter be described in detail.

The base station (BS) may use a variety of methods to inform the UE of the RACH type. For example, the base station (BS) may sequentially assign numbers to preamble types, and may also indicate a number of a preamble type to be used by the UE.

The following table 4 shows an exemplary method for sequentially numbering the preamble types of Table 2.

TABLE 4

| Frame structure | Preamble format | $T_{CP}$ | $T_{SEQ}$ |
|---|---|---|---|
| Type 1 | 0 | 3152 × $T_S$ | 24576 × $T_S$ |
|  | 1 | 21012 × $T_S$ | 24576 × $T_S$ |
|  | 2 | 21012 × $T_S$ | 2 × 24576 × $T_S$ |
|  | 3 | 3152 × $T_S$ | 2 × 24576 × $T_S$ |

With reference to Table 4, the base station (BS) may inform the UE of the preamble format using 2 bits. For example, "00" is a preamble format of 0, "01" is a preamble format of 1, "10" is a preamble format of 2, and "11" is a preamble format of 3.

Although the above Table 4 has been disclosed using Table 2 as an example, it should be noted that Table 4 may also be applied to other tables 1 and 3 as necessary. For another example, besides the method of Table 4, another method for numbering the preamble format can also be used.

Furthermore, there is another method for indicating the RACH CP information and the sequence information using one or more bits. In other words, the base station (BS) informs the UE of the RACH CP's length information (or information of CP extension) using a predetermined number of bits, and may inform the UE of information of the sequence length (or the presence or absence of sequence repetition) using other bits.

The following table 5 shows an example of RACH information using one or more bits (e.g., 2 bits).

TABLE 5

| Frame structure | Preamble type | $T_{CP}$ | $T_{SEQ}$ |
|---|---|---|---|
| Type 1 | 00 | 3152 × $T_S$ | 24576 × $T_S$ |
|  | 10 | 21012 × $T_S$ | 24576 × $T_S$ |
|  | 01 | 3152 × $T_S$ | 2 × 24576 × $T_S$ |
|  | 11 | 21012 × $T_S$ | 2 × 24576 × $T_S$ |

Table 5 shows an example of the RACH structure of Table 2. Referring to Table 5, the base station (BS) may inform the UE of RACH information using 1 bit indicating the sequence length and 1 bit indicating the CP length. If 2 bits are represented by "XX", the front bit indicates a time length of the CP, and the rear bit indicates a time length of the sequence.

In more detail, "00" indicates that a time length of the sequence is 24576×TS and the CP's time-length is 3152×TS. "10" indicates that a sequence's time-length is 24576×TS and the CP's time-length is 21012×TS. "01" is used to increase the reliability under a poor channel environment.

Namely, although the CP is set to 3152×TS, the RACH reliability can be increased by the repeated sequence denoted by (2×24576×TS). "11" indicates that the time length of the repeated sequence is 2×24576×TS and the CP's time-length is 21012×TS.

Although the above Table 5 has been disclosed for only illustrative purposes of Table 2, it should be noted that Table 5 can also be applied to Table 1 or 3. Besides the method of Table 5, another method for numbering the RACH preamble formats can also be used. Needless to say, the base station (BS) may information the UE of the RACH type using other 2 bits, instead of the above-mentioned method.

The above Tables 1~3 can be briefly represented by the following tables 6~8 on the basis of TCP and TSEQ.

The following table 6 simplifies the above table 1.

TABLE 6

| Frame structure | $T_{CP}$ | $T_{SEQ}$ |
|---|---|---|
| Type 1 | 3152 × $T_S$ | 24576 × $T_S$ |
|  | 20993 × $T_S$ | 2 × 24576 × $T_S$ |

Table 6 does not define the TRA length of Table 1. In Table 6, the TRA length is acquired by considering TCP- and TSEQ-lengths and the GT length. In this case, the GT's time-length value can be arbitrarily decided by the base station, such that there is no need to define the TRA length on the condition that the time-length values of TCP and TSEQ have been recognized.

The following table 7 simplifies the above Table 2.

TABLE 7

| Frame structure | $T_{CP}$ | $T_{SEQ}$ |
|---|---|---|
| Type 1 | 3152 × $T_S$ | 24576 × $T_S$ |
|  | 21012 × $T_S$ | 2 × 24576 × $T_S$ |

Table 7 is basically equal to Table 2. In Table 7, TCP and TSEQ values can be calculated by the same method as that of Table 2.

The following table 8 simplifies the above Table 3.

TABLE 8

| Frame structure | $T_{CP}$ | $T_{SEQ}$ |
|---|---|---|
| Type 1 | 3152 × $T_S$ | 24576 × $T_S$ |
|  | 21760 × $T_S$ | 2 × 24576 × $T_S$ |

In Table 8, TCP and TSEQ values can be calculated by the same conditions as in Table 3.

The present invention is able to construct the RACH preamble of FIG. 5 using a predetermined number of CPs and the sequence's time-length of FIGS. 2~4. In more detail, the present invention can construct the RACH preamble of FIG. 5 using TCP and TSEQ values of Tables 1~8.

In the embodiments of the present invention, the CP and sequence of the RACH are constructed, such that the base station (BS) can cover the cell radius of about 100 km. However, provided that the repeated sequence is used and the 3 TTI RACH signal is used within the cell radius larger than 14.61 km, wasted radio resources may occur. Therefore, in order to prevent radio resources from being wasted, a method for calculating a parameter in which a single middle CP is further added to the above-mentioned CP length will hereinafter be described in detail.

Figure 6:
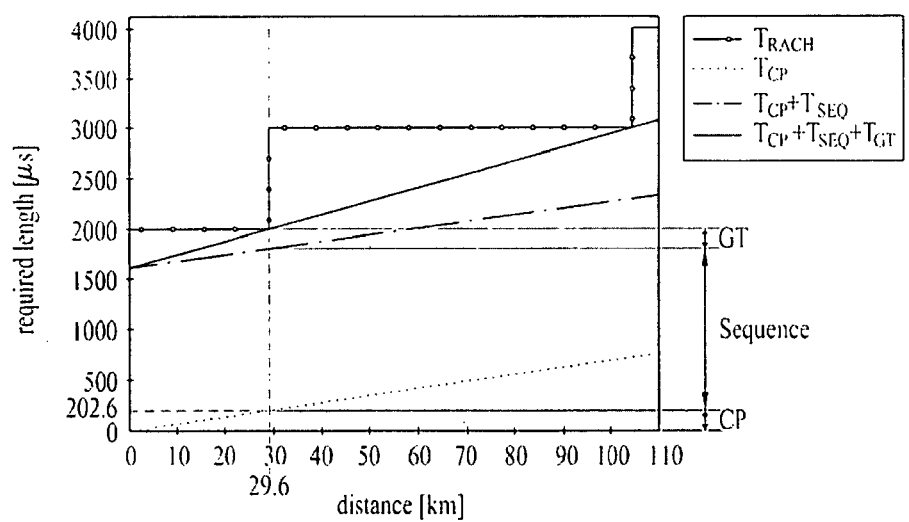
FIG. 6 is a graph illustrating a variance in CP, GT, or RACH length required for a cell radius according to the present invention.

FIG. 6 is a graph illustrating a variance in CP, GT, or RACH length required for a cell radius according to the present invention.

Numerical values for use in the embodiments of the present invention are disclosed for only illustrative purposes, and it is obvious to those skilled in the art that the numerical values can be changed to others according to user requirements or communication environments.

Referring to FIG. 6, TRACH is a TTI allocated to the RACH according to the cell radius. In this case, "1 TTI" has the length of 1000 (1 ms), "TCP" is a CP variance based on the cell radius, "TCP+TSEQ" is a variance of the sum of TCP and TSEQ lengths, and "TCP+TSEQ+TGT" is a variance of an actual RACH length based on the cell radius. In order to calculate the time length of the RACH CP, it is assumed that a maximum delay spread time is set to 5.21, Referring to FIG. 6, the present invention can calculate the CP of the largest cell radius (29.6 km) capable of being supported by the 2000 (i.e., 2 TTIs) RACH duration. Namely, 202.6 may be calculated as a middle CP value. Therefore, the base station (BS) may allocate the 2 TTIs to the RACH, simultaneously while applying the repeated sequence to the cell radius of about 29.6 km.

Differently from FIG. 6, a middle CP value may be calculated. Referring to FIG. 2b, the base station (BS) allocates the 2 TTIs to the RACH, such that the largest cell radius capable of being supported is about 28.75 km. In this case, the CP value may be about 208.335, In this case, a maximum delay spread time of FIG. 2b is 16.67, FIGS. 7a~7b are graphs illustrating RACH structures configured when a predetermined-length CP and predetermined-length sequence are used according to middle CP values of FIGS. 2b and 6 according to the present invention.

Figure 7A:
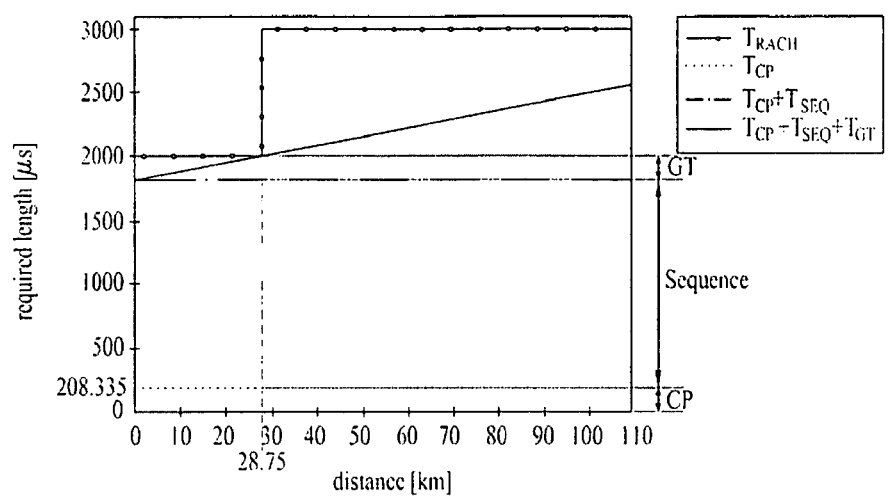
FIGS. 7a~7b are graphs illustrating RACH structures configured when a predetermined-length CP and predetermined-length sequence are used according to middle CP values of FIGS. 2b and 6 according to the present invention.

In FIG. 7a, it is assumed that the middle CP value is set to 202.6 in consideration of the maximum channel delay spread (5.21). In this case, the middle CP value has a supportable cell-radius smaller than that of the extended CP, such that the present invention can also consider a maximum channel delay spread time shorter than that of the extended CP.

The sequence length may be set to 1.6 ms on the condition that the repeated sequence is used. Therefore, although the base station (BS) uses the repeated sequence and the 2 TTIs are allocated to the RACH, the base station (BS) can effectively use radio resources. Also, the base station (BS) can elastically adjust the GT value according to the cell radius as shown in FIG. 7a.

Figure 7B:
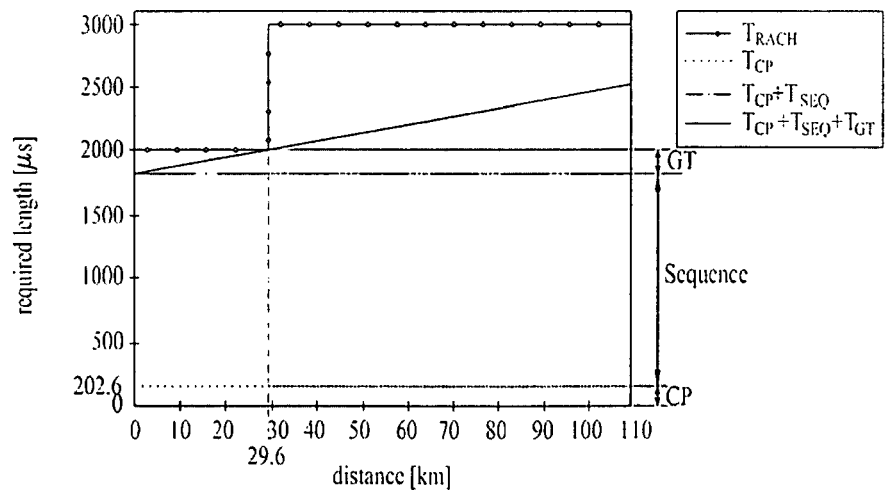

As can be seen from FIG. 7b, the middle CP can be exemplarily set to 208.35 in consideration of the maximum delay spread (16.67). In this case, the sequence time-length is 1.6 ms, and the repeated sequence may be used as the sequence time length. If the base station (BS) allocates 2 TTIs to the RACH, the maximum cell radius capable of being covered by the base station (BS) may be about 28.75 km Referring to FIGS. 7a and 7b, the base station (BS) allocates the 2 TTIs to the RACH, such that it is able to cover the cell radius of about 30 km. In FIGS. 2~4, if the base station (BS) uses the CP value or the sequence for allowing the base station (BS) to cover the cell radius of 100 km, the 3 TTIs must be used. In this case, if the cell radius is much smaller than 100 km (e.g., if the cell radius is 30 km or less) and the 3 TTIs are continuously allocated to the RACH, unnecessary radio resources may be wasted.

Therefore, as shown in FIGS. 7a and 7b, if the middle CP value is calculated and the RACH is configured using the calculated CP value, the cell radius of about 30 km may use the 2 TTIs as the RACH interval simultaneously while using the repeated sequence. In other words, the base station (BS) minimizes the wasted radio resources, and at the same time can cover the cell radius of about 30 km.

The following table 9 shows an example of a RACH preamble format including the middle CP value.

TABLE 9

| Frame structure | Preamble Type | $T_{RA}$ | $T_{CP}$ | $T_{SEQ}$ |
|---|---|---|---|---|
| Type 1 | Normal | 30720 × $T_S$ | 3152 × $T_S$ | 24576 × $T_S$ |
|  | Extended | 61440 × $T_S$ | 20993 × $T_S$ | 24576 × $T_S$ |
|  |  | 92160 × $T_S$ |  |  |

TABLE 9-continued

| Frame structure | Preamble Type | $T_{RA}$ | $T_{CP}$ | $T_{SEQ}$ |
|---|---|---|---|---|
| | Repeated 1 | 61440 × $T_S$ 92160 × $T_S$ | 3152 × $T_S$ 20993 × $T_S$ | 2 × 24576 × $T_S$ |
| | Repeated 2 | 61440 × $T_S$ | 3152 × $T_S$ 6400 × $T_S$ | 2 × 24576 × $T_S$ |

Table 9 is basically similar to Table 1. If the cell radius covered by the base station (BS) is about 100 km, the RACH preamble's parameters are shown in Table 9. Compared with Table 1, Table 9 includes a RACH preamble (i.e., Repeated 2) for a specific case having the cell radius of about 30 km.

In Table 9, if the preamble type is indicative of "Normal", "Normal" indicates a normal RACH. In this case, the CP time-length of the RACH is represented by 3152×TS, and the sequence's time-length is set to 24576×TS.

If the preamble type is "Extended", a RACH duration of the base station (BS) is set to 2 TTIs (e.g., TRA=61440×TS) or 3 TTIs (e.g., TRA=92160×TS), such that the selected RACH duration is allocated the user equipment (UE). In this case, the base station (BS) may use an extended CP (e.g., 20993×TS). In this case, the CP length of the RACH is represented by 20993×TS (i.e., CP=683.381) and the sequence length is represented by 24576×TS.

If the preamble type is "Repeated 1" and the base station (BS) uses the CP having the length 20993×TS, the base station (BS) allocates the 3 TTIs to the RACH. However, if the repeated RACE uses a short CP (e.g., CP=3152×TS), the base station (BS) can optionally determine the RACH duration to be 2 TTIs (e.g., 2 ms) or 3 TTIs (e.g., 3 ms) in the same manner as in the extended RACH. In this case, the CP length of the RACH may be set to 3152×TS or 20993×TS, and the time length of the sequence may be set to 2×24576×TS.

If the preamble type is "Repeated 2", this means that the base station (BS) uses the middle CP value as a RACH CP value. Namely, "Repeated 2" is indicative of the RACH structure having the length of CP=6400×TS. In this case, although the base station (BS) uses the repeated sequence when constructing the RACH, 2 TTIs are allocated to the RACH, such that the base station (BS) can cover the cell coverage corresponding to 30 km. Namely, "Repeated 2" RACH signal can be effectively used on the condition that the cell coverage is about 30 km or less.

The following table 10 shows another example of a RACH preamble format including a middle CP value according to the present invention.

TABLE 10

| Frame structure | Preamble Type | $T_{RA}$ | $T_{CP}$ | $T_{SEQ}$ |
|---|---|---|---|---|
| Type 1 | Normal | 30720 × $T_S$ | 3152 × $T_S$ | 24576 × $T_S$ |
| | Extended | 61440 × $T_S$ 92160 × $T_S$ | 20993 × $T_S$ | 24576 × $T_S$ |
| | Repeated 1 | 61440 × $T_S$ 92160 × $T_S$ | 3152 × $T_S$ 20993 × $T_S$ | 2 × 24576 × $T_S$ |
| | Repeated 2 | 61440 × $T_S$ | 3152 × $T_S$ 6224 × $T_S$ | 2 × 24576 × $T_S$ |

Table 10 includes RACH parameters on the condition that the RACH CP value is 683.381 (if the cell coverage is about 100 km) or 202.6 (if the cell radius is about 30 km).

The above-mentioned RACH parameters of Table 10 are similar to those of Table 1. Compared with Table 1, in order to effectively allocate radio resources to the RACH when the cell radius is about 30 km, the preamble type of "Repeated 2" is newly established in Table 10. In more detail, a middle CP value (6224×TS or 202.6) corresponding to 202.06 is newly established, and associated RACH parameters are defined in Table 10.

The following table 11 shows another example of a RACH preamble format including a middle CP value according to the present invention.

TABLE 11

| Frame structure | Preamble Type | $T_{RA}$ | $T_{CP}$ | $T_{SEQ}$ |
|---|---|---|---|---|
| Type 1 | Normal | 30720 × $T_S$ | 3152 × $T_S$ | 24576 × $T_S$ |
| | Extended | 61440 × $T_S$ 92160 × $T_S$ | 21012 × $T_S$ | 24576 × $T_S$ |
| | Repeated 1 | 61440 × $T_S$ 92160 × $T_S$ | 3152 × $T_S$ 21012 × $T_S$ | 2 × 24576 × $T_S$ |
| | Repeated 2 | 61440 × $T_S$ | 3152 × $T_S$ 6400 × $T_S$ | 2 × 24576 × $T_S$ |

Table 11 includes RACH parameters on the condition that the RACH CP value is 684 (if the cell coverage is about 100 km) or 208.335 (if the cell radius is about 30 km).

Table 11 is similar to Table 2. Compared with Table 2, the preamble type of "Repeated 2" is newly established in Table 11, such that the RACH can be effectively used when the cell radius is about 30 km.

The following table 12 shows another example of a RACH preamble format including a middle CP value according to the present invention.

TABLE 12

| Frame Structure | Preamble Type | $T_{RA}$ | $T_{CP}$ | $T_{SEQ}$ |
|---|---|---|---|---|
| Type 1 | Normal | 30720 × $T_S$ | 3152 × $T_S$ | 24576 × $T_S$ |
| | Extended | 61440 × $T_S$ 92160 × $T_S$ | 21012 × $T_S$ | 24576 × $T_S$ |
| | Repeated 1 | 61440 × $T_S$ 92160 × $T_S$ | 3152 × $T_S$ 21012 × $T_S$ | 2 × 24576 × $T_S$ |
| | Repeated 2 | 61440 × $T_S$ | 3152 × $T_S$ 6224 × $T_S$ | 2 × 24576 × $T_S$ |

Table 12 includes RACH parameters on the condition that the RACH CP value is 684 (if the cell coverage is about 100 km) or 202.6 (if the cell radius is about 30 km).

Table 12 is basically similar to Table 2. Compared with Table 2, in order to effectively use the RACH preamble when the cell radius is about 30 km, a new preamble type (i.e., Repeated 2) including a middle CP value is newly established in Table 12.

The following table 13 shows another example of a RACH preamble format including a middle CP value according to the present invention.

TABLE 13

| Frame structure | Preamble Type | $T_{RA}$ | $T_{CP}$ | $T_{SEQ}$ |
|---|---|---|---|---|
| Type 1 | Normal | 30720 × $T_S$ | 3152 × $T_S$ | 24576 × $T_S$ |
| | Extended | 61440 × $T_S$ 92160 × $T_S$ | 21760 × $T_S$ | 24576 × $T_S$ |
| | Repeated 1 | 61440 × $T_S$ 92160 × $T_S$ | 3152 × $T_S$ 21760 × $T_S$ | 2 × 24576 × $T_S$ |
| | Repeated 2 | 61440 × $T_S$ | 3152 × $T_S$ 6400 × $T_S$ | 2 × 24576 × $T_S$ |

Table 13 includes RACH parameters on the condition that the RACH CO value is 708.335 (if the cell coverage is about 103 km) or 208.335 (if the cell radius is about 30 km).

Table 13 is basically similar to Table 3. Compared with Table 3, in order to effectively use the RACH preamble when the cell radius is about 30 km, a new preamble type (i.e., Repeated 2) including a middle CP value is newly established in Table 13.

The following table 14 shows another example of a RACH preamble format including a middle CP value according to the present invention.

TABLE 14

| Frame Structure | Preamble Type | $T_{RA}$ | $T_{CP}$ | $T_{SEQ}$ |
|---|---|---|---|---|
| Type 1 | Normal | $30720 \times T_S$ | $3152 \times T_S$ | $24576 \times T_S$ |
| | Extended | $61440 \times T_S$ $92160 \times T_S$ | $21760 \times T_S$ | $24576 \times T_S$ |
| | Repeated 1 | $61440 \times T_S$ $92160 \times T_S$ | $3152 \times T_S$ $21760 \times T_S$ | $2 \times 24576 \times T_S$ |
| | Repeated 2 | $61440 \times T_S$ | $3152 \times T_S$ $6244 \times T_S$ | $2 \times 24576 \times T_S$ |

Table 14 includes RACH parameters on the condition that the RACH CP value is 708.335 (if the cell coverage is about 103 km) or 202.6 (if the cell radius is about 30 km).

Table 14 is basically similar to Table 3. Compared with Table 3, in order to effectively use the RACH preamble when the cell radius is about 30 km, a new preamble type (i.e., Repeated 2) including a middle CP value is newly established in Table 14.

Figure 8:
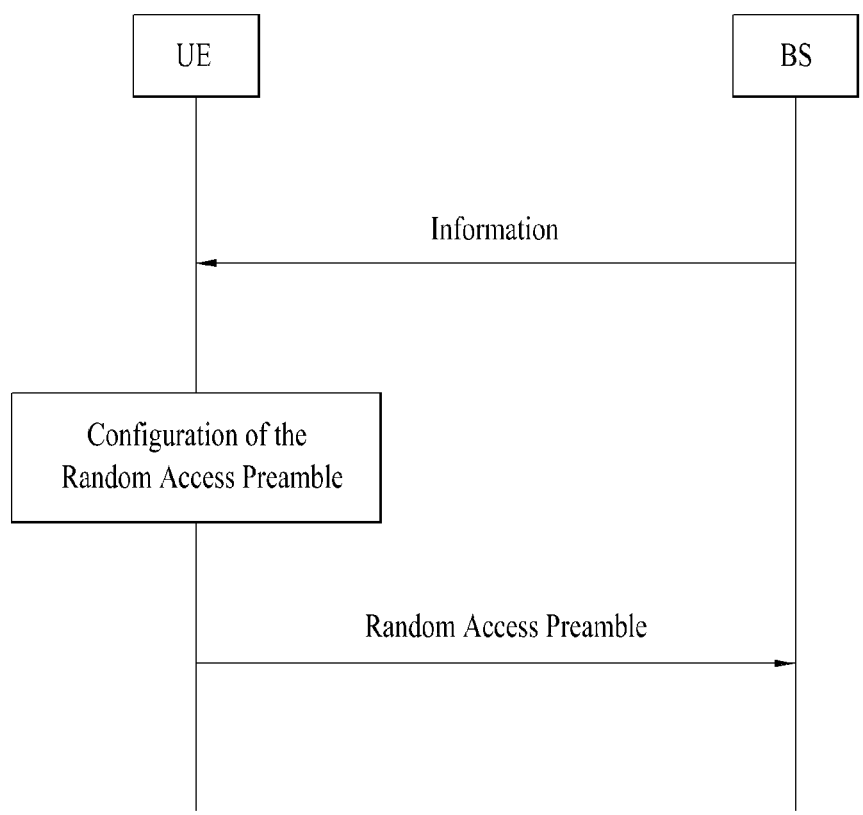
FIG. 8 illustrates a base station (BS) informing a UE (user equipment) of configuration information regarding RACH preambles.

A method for allowing the base station (BS) to inform the UE of the configuration information of the RACH preamble type shown in Tables 9 to 14 according to the present invention will hereinafter be described in detail (see also, e.g., FIG. 8).

The base station (BS) may inform the UE of the RACH preamble type in various ways. Firstly, the base station (BS) may sequentially number the preamble types, and may indicate the preamble-type number to be used by the user equipment (UE).

The following table 15 shows an exemplary method for sequentially numbering the preamble types shown in Table 12.

TABLE 15

| Frame Structure | Preamble Type | $T_{CP}$ | $T_{SEQ}$ |
|---|---|---|---|
| Type 1 | 0 | $3152 \times T_S$ | $24576 \times T_S$ |
| | 1 | $21012 \times T_S$ | $24576 \times T_S$ |
| | 2 | $6224 \times T_S$ | $2 \times 24576 \times T_S$ |
| | 3 | $21012 \times T_S$ | $2 \times 24576 \times T_S$ |

With reference to Table 15, the base station (BS) may inform the UE of the preamble format using 2 bits. For example, "00" is a preamble format of 0, "01" is a preamble format of 1, "10" is a preamble format of 2, and "11" is a preamble format of 3.

Although the above Table 15 has been disclosed using Table 12 as an example, it should be noted that Table 9 may also be applied to other tables 9, 11, 13, and 14 as necessary. For another example, besides the method of Table 15, another method for numbering the preamble format can also be used.

Furthermore, there is another method for indicating the RACH CP information and the sequence information using one or more bits. In other words, the base station (BS) informs the UE of the RACH CP's length information (or information of CP extension) using a predetermined number of bits, and may inform the UE of information of the sequence length (or the presence or absence of sequence repetition) using other bits.

The following table 16 shows an example of RACH information using one or more bits (e.g., 2 bits).L

TABLE 16

| Frame Structure | Preamble Type | $T_{CP}$ | $T_{SEQ}$ |
|---|---|---|---|
| Type 1 | 00 | $3152 \times T_S$ | $24576 \times T_S$ |
| | 10 | $21012 \times T_S$ | $24576 \times T_S$ |
| | 11 | $21012 \times T_S$ | $2 \times 24576 \times T_S$ |
| | 01 | $6224 \times T_S$ | $2 \times 24576 \times T_S$ |

Table 16 shows that the RACH preamble type of Table 12 is established according to the CP time-length and the sequence repetition. In this case, the sequence time-length can be recognized by the bit indicating whether the sequence is repeated.

With reference to Table 16, the base station (BS) may inform the UE of RACH information using 1 bit indicating the sequence length and 1 bit indicating the CP length. If 2 bits are represented by "XX", the front bit indicates a time length of the CP, and the rear bit indicates whether the sequence is repeated.

For example, "00" indicates that a single sequence is used and the CP has a short time length. In more detail, the sequence is not repeated, a time length of the sequence is 24576×TS and the CP's time-length is 3152×TS. "10" indicates that the sequence is not repeated and the CP's time-length is 3152×TS. "11" indicates the repeated sequence is used, such that the sequence time-length is 2×24576×TS and the CP's time-length is 21012×TS. "01" indicates that the sequence is repeated and the CP's time-length is 6224×TS.

Therefore, although Table 16 shows three CP's time-lengths, three CP's time-lengths are conditionally selected, such that all combinations can be represented by 1 bit indicating whether the sequence is repeated and the other 1 bit indicating the CP's time-length.

Although Table 16 has been disclosed using Table 12 as an example, it should be noted that Table 16 may also be applied to other Tables 9~14 as necessary.

Tables 9~14 can be simplified in the form of Tables 17~22 on the basis of TCP and TSEQ values. The time length TGT can be arbitrarily decided by the base station (BS), and the TRA length is decided by TCP and TSEQ values. Therefore, the RACH preamble can be constructed by only the TCP and TSEQ values other than the TRA length.

The following Table 17 is a simplified format of Table 9.

TABLE 17

| Frame Structure | $T_{CP}$ | $T_{SEQ}$ |
|---|---|---|
| Type 1 | $3152 \times T_S$ | $24576 \times T_S$ |
| | $20993 \times T_S$ | |
| | $6400 \times T_S$ | $2 \times 24576 \times T_S$ |

Table 17 is basically equal to Table 9. TCP and TSEQ values of Table 17 can be calculated in the same manner as in the method of Table 9.

The following Table 18 is a simplified format of Table 10.

TABLE 18

| Frame Structure | $T_{CP}$ | $T_{SEQ}$ |
| --- | --- | --- |
| Type 1 | $3152 \times T_S$ | $24576 \times T_S$ |
|  | $20993 \times T_S$ |  |
|  | $6224 \times T_S$ | $2 \times 24576 \times T_S$ |

TCP and TSEQ values of Table 18 can be calculated in the same manner as in the method of Table 10.

The following Table 19 is a simplified format of Table 11.

TABLE 19

| Frame Structure | $T_{CP}$ | $T_{SEQ}$ |
| --- | --- | --- |
| Type 1 | $3152 \times T_S$ | $24576 \times T_S$ |
|  | $21012 \times T_S$ |  |
|  | $6400 \times T_S$ | $2 \times 24576 \times T_S$ |

Table 19 is basically equal to Table 11. TCP and TSEQ values of Table 19 can be calculated in the same manner as in the method of Table 11.

The following Table 20 is a simplified format of Table 12.

TABLE 20

| Frame Structure | $T_{CP}$ | $T_{SEQ}$ |
| --- | --- | --- |
| Type 1 | $3152 \times T_S$ | $24576 \times T_S$ |
|  | $21012 \times T_S$ |  |
|  | $6224 \times T_S$ | $2 \times 24576 \times T_S$ |

Table 20 is basically equal to Table 12. TCP and TSEQ values of Table 20 can be calculated in the same manner as in the method of Table 12.

The following Table 21 is a simplified format of Table 13.

TABLE 21

| Frame Structure | $T_{CP}$ | $T_{SEQ}$ |
| --- | --- | --- |
| Type 1 | $3152 \times T_S$ | $24576 \times T_S$ |
|  | $21760 \times T_S$ |  |
|  | $6400 \times T_S$ | $2 \times 24576 \times T_S$ |

Table 21 is basically equal to Table 13. TCP and TSEQ values of Table 20 can be calculated in the same manner as in the method of Table 13.

The following Table 20 is a simplified format of Table 14.

TABLE 22

| Frame Structure | $T_{CP}$ | $T_{SEQ}$ |
| --- | --- | --- |
| Type 1 | $3152 \times T_S$ | $24576 \times T_S$ |
|  | $21760 \times T_S$ |  |
|  | $6224 \times T_S$ | $2 \times 24576 \times T_S$ |

TCP and TSEQ values of Table 22 can be calculated in the same manner as in the method of Table 14.

As described above, the above embodiment has disclosed the method for establishing a predetermined CP's time-length and the CP type. However, in view of a method for easily supporting a variety of system bandwidths, the CP time-length may be changed to another due to hardware problems. However, although the CP time-length is slightly changed to another, the changed result is not affected on the scope of the present invention irrespective of variation of the CP time-length.

For example, the CP time-length can be adjusted by the relationship between the sampling frequencies. The above-mentioned examples have described that the sampling frequency is exemplarily set to 30.72 MHz, but it should be noted that the CP time-length can also be adjusted at a sampling frequency of 1.92 MHz or 3.84 MHz.

In this case, the relationship between the above sampling frequencies is denoted by a multiple. In other words, 1.92 MHz times 16 (i.e., 1.92 MHz multiplied by 16) is 30.72 MHz, 1.92 MHz times 2 (i.e., 1.92 MHz multiplied by 2) is 3.84 MHz, and 3.84 MHz times 8 (i.e., 1.92 MHz multiplied by 8) is 30.72 MHz. In this case, it is preferable that the number of CP samples is denoted by a multiple in the same manner as in the multiple relationship between sampling frequencies under various operation bands. Therefore, it is preferable that the number of CP samples may be denoted by a multiple of 8 or 16.

If the CP time-length is adjusted by the relationship between the sampling frequencies, (21012×TS) samples of Table 11 are not denoted by the multiple of 8 or 16, such that they must be modified into others. In the case where the parameters of Table 11 are adjusted for the relationship between the sampling frequencies, they are shown in the following table 23.

TABLE 23

| Frame structure | Preamble Type | TCP | TSEQ |
| --- | --- | --- | --- |
|  | Normal | $3152 \times T_S$ | $24576 \times T_S$ |
|  | Extended | $21008 \times T_S$ | $24576 \times T_S$ |
|  | Repeated 1 | $3152 \times T_S$ | $2 \times 24576 \times T_S$ |
|  |  | $21008 \times T_S$ |  |
|  | Repeated 2 | $3152 \times T_S$ | $2 \times 24576 \times T_S$ |
|  |  | $6224 \times T_S$ |  |

According to another embodiment of the present invention, parameters can be adjusted to others in consideration of the relationship between the sampling frequencies (e.g., fIFFT) of the RACH sequence.

The RACH sequence is generated by a hybrid frequency/time domain generation. In more detail, firstly, a small-sized IDFT is performed, an up-sampling toward a system band is performed, a frequency conversion is performed by an intermediate frequency needed by a time domain.

For example, it is assumed that the sample length of a sequence for use in the RACH is denoted by 839. In this case, the sample length of the sequence is indicative of the length of a sequence generated by the sequence generation equation. If a first IFFT size is 1024, the sampling frequency (fIFFT) is 1.28 Mbps. According to the above-mentioned reason, the number of CP samples must be denoted by a multiple of 24. In order to simultaneously satisfy two kinds of multiple conditions, the number of CP samples must be denoted by a multiple of 48. Therefore, the CP length can be adjusted by the sampling frequency and the RACH-sequence sampling frequency.

The following Table 24 shows parameters corrected by the relationship between the RACH-preamble sampling frequencies of Table 11.

TABLE 24

| Frame Structure | Preamble Type | TCP | TSEQ |
|---|---|---|---|
| | Normal | $3168 \times T_S$ | $24576 \times T_S$ |
| | Extended | $21024 \times T_S$ | $24576 \times T_S$ |
| | Repeated 1 | $3168 \times T_S$ $21024 \times T_S$ | $2 \times 24576 \times T_S$ |
| | Repeated 2 | $3168 \times T_S$ $6240 \times T_S$ | $2 \times 24576 \times T_S$ |

The above-mentioned embodiments of the present invention use a less number of CPs, resulting in reduction of a hardware complexity. The base station (BS) can manage or cover a desired cell radius using a small number of RACH structures. Also, the base station (BS) arbitrarily decides GT information, such that the present invention can support a variety of cell coverages using a single RACH preamble structure.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

The present invention has the following effects.

Firstly, the present invention uses a fixed number of CPs, such that it reduces the complexity of a hardware design and constructs a less number of RACH preambles.

Secondly, if a base station (BS) uses a predetermined CP within a coverable cell radius, it need not consider the CP length on the basis of the cell radius, such that it can effectively process a system.

Thirdly, the guard time (GT) information is not transmitted to the user, and the base station (BS) arbitrarily establishes the GT information according to the cell radius, such that a variety of cell coverages can be supported by a less number of RACH burst structures.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As apparent from the above description, the present invention can be applied to a variety of communication technologies. Specifically, the present invention can be applied to a broadband wireless communication system. The present invention uses the RACH burst structure, such that it can effectively perform the system processing.

What is claimed is:

1. A method for transmitting a random access preamble, the method comprising:
    receiving, by a user equipment (UE), information that is associated with predetermined preambles for a random access; and
    transmitting, by the UE, a random access preamble selected from the predetermined preambles according to the information,
    wherein the selected random access preamble has a preamble format defined by a time-length value of a predetermined cyclic prefix (CP) and either a time-length value of a sequence or a time-length value of a repeated sequence,
    wherein the time-length value of the repeated sequence is two times the time-length value of the sequence,
    wherein the selected random access preamble is configured only with the predetermined CP and either the sequence or the repeated sequence without a time length of a guard time (GT),
    wherein the repeated sequence is configured by repeating the sequence, and
    wherein the time-length value of the predetermined CP is the same whether the sequence or the repeated sequence configures the selected random access preamble.

2. The method according to claim 1, further comprising:
    acquiring, by the UE, at least the time-length value of the predetermined CP, either the time-length value of the sequence or the time-length value of the repeated sequence, or an indication of whether the sequence or the repeated sequence configures the selected random access preamble based on the information.

3. The method according to claim 1, wherein the preamble format is defined for one transmission timing interval (TTI), two TTIs or three TTIs.

4. The method according to claim 1, wherein:
    the time-length value of the predetermined CP is $3168 \times T_S$, $21024 \times T_S$, or $6240 \times T_S$;
    the time-length value of the sequence is $24576 \times T_S$;
    the time-length value of the repeated sequence is $2 \times 24576 \times T_S$; and
    $T_s$ is a basic time unit.

5. A method for receiving a random access preamble, the method comprising:
    broadcasting, by a base station (BS), information associated with predetermined preambles for a random access; and
    receiving, by the BS, a random access preamble selected from the predetermined preambles according to the information,
    wherein the selected random access preamble has a preamble format defined by a time-length value of a predetermined cyclic prefix (CP) and either a time-length value of a sequence or a time-length value of a repeated sequence,
    wherein the time-length value of the repeated sequence is two times the time-length value of the sequence,
    wherein the selected random access preamble is configured only with the predetermined CP and either the sequence or the repeated sequence without a time length of a guard time (GT),
    wherein the repeated sequence is configured by repeating the sequence, and
    wherein the time-length value of the predetermined CP is the same whether the sequence or the repeated sequence configures the selected random access preamble.

6. The method according to claim 5, wherein at least the time-length value of the predetermined CP, either the time-length value of the sequence or the time-length value of the repeated sequence, or an indication of whether the sequence or the repeated sequence configures the selected random access preamble is acquired from the information.

7. The method according to claim 5, wherein the preamble format is defined for one transmission timing interval (TTI), two TTIs or three TTIs.

8. The method according to claim 5, wherein:
    the time-length value of the predetermined CP is $3168 \times T_S$, $21024 \times T_S$, or $6240 \times T_S$;
    the time-length value of the sequence is $24576 \times T_S$;
    the time-length value of the repeated sequence is $2 \times 24576 \times T_S$; and
    $T_s$ is a basic time unit.

9. A user equipment (UE) for transmitting a random access preamble, the UE configured to:
   receive information associated with predetermined preambles for a random access; and
   transmit a random access preamble selected from the predetermined preambles according to the information,
   wherein the selected random access preamble has a preamble format defined by a time-length value of a predetermined cyclic prefix (CP) and either a time-length value of a sequence or a time-length value of a repeated sequence,
   wherein the time-length value of the repeated sequence is two times the time-length value of the sequence,
   wherein the selected random access preamble is configured only with the predetermined CP and either the sequence or the repeated sequence without a time length of a guard time (GT),
   wherein the repeated sequence is configured by repeating the sequence, and
   wherein the time-length value of the predetermined CP is the same whether the sequence or the repeated sequence configures the selected random access preamble.

10. The UE according to claim 9, wherein the UE acquires at least the time-length value of the predetermined CP, either the time-length value of the sequence or the time-length value of the repeated sequence, or an indication of whether the sequence or the repeated sequence configures the selected random access preamble based on the information.

11. The UE according to claim 9, wherein the preamble format is defined for one transmission timing interval (TTI), two TTIs or three TTIs.

12. The UE according to claim 9, wherein:
   the time-length value of the predetermined CP is $3168 \times T_S$, $21024 \times T_S$, or $6240 \times T_S$;
   the time-length value of the sequence is $24576 \times T_S$;
   the time-length value of the repeated sequence is $2 \times 24576 \times T_S$; and
   $T_s$ is a basic time unit.

13. A base station (BS) for receiving a random access preamble, the BS configured to:
   broadcast information associated with predetermined preambles for a random access; and
   receive a random access preamble selected from the predetermined preambles according to the information,
   wherein the selected random access preamble has a preamble format defined by a time-length value of a predetermined cyclic prefix (CP) and either a time-length value of a sequence or a time-length value of a repeated sequence,
   wherein the time-length value of the repeated sequence is two times the time-length value of the sequence,
   wherein the selected random access preamble is configured only with the predetermined CP and either the sequence or the repeated sequence without a time length of guard time (GT),
   wherein the repeated sequence is configured by repeating the sequence, and
   wherein the time-length value of the predetermined CP is the same whether the sequence or the repeated sequence configures the selected random access preamble.

14. The BS according to claim 13, wherein at least the time-length value of the predetermined CP, either the time-length value of the sequence or the time-length value of the repeated sequence, or an indication of whether the sequence or the repeated sequence configures the selected random access preamble is acquired from the information.

15. The BS according to claim 13, wherein the preamble format is defined for one transmission timing interval (TTI), two TTIs or three TTIs.

16. The BS according to claim 13, wherein:
   the time-length value of the predetermined CP is $3168 \times T_S$, $21024 \times T_S$, or $6240 \times T_S$;
   the time-length value of the sequence is $24576 \times T_S$;
   the time-length value of the repeated sequence is $2 \times 24576 \times T_S$; and
   $T_s$ is a basic time unit.

* * * * *